United States Patent
Bandyopadhyay et al.

(10) Patent No.: US 9,983,972 B2
(45) Date of Patent: May 29, 2018

(54) PREDICTIVE IN-FIELD MEMORY REPAIR SCHEME

(71) Applicant: Cisco Technology, Inc., San Jose, CA (US)

(72) Inventors: Subhra Sundar Bandyopadhyay, Cupertino, CA (US); Jayanth Sankar Mekkoth, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 87 days.

(21) Appl. No.: 14/727,534

(22) Filed: Jun. 1, 2015

(65) Prior Publication Data

US 2016/0350199 A1    Dec. 1, 2016

(51) Int. Cl.
| | |
|---|---|
| *G06F 11/00* | (2006.01) |
| *G06F 11/34* | (2006.01) |
| *G06F 11/07* | (2006.01) |
| *G06F 11/16* | (2006.01) |
| *G06F 11/10* | (2006.01) |

(52) U.S. Cl.
CPC ........ *G06F 11/3471* (2013.01); *G06F 11/073* (2013.01); *G06F 11/0751* (2013.01); *G06F 11/0766* (2013.01); *G06F 11/1016* (2013.01); *G06F 11/167* (2013.01)

(58) Field of Classification Search
CPC ............. G06F 11/0766; G06F 11/0751; G06F 11/1016; G06F 11/3452; G06F 11/08; G06F 11/1024; G06F 11/22; G06F 11/30
See application file for complete search history.

(56) References Cited

U.S. PATENT DOCUMENTS

| | | | |
|---|---|---|---|
| 5,996,109 | A | 11/1999 | Shikakura |
| 6,163,871 | A | 12/2000 | Yang |
| 7,085,971 | B2 | 8/2006 | Barth et al. |
| 8,086,737 | B2 | 12/2011 | Chandrupatla et al. |

(Continued)

OTHER PUBLICATIONS

Nicolaidis et al., "A diversified memory built-in self-repair approach for nanotechnologies," DOI: 10.1109/ Proceedings of the 22nd IEEE VLSI Test Symposium, 2004, 6 pages.

(Continued)

*Primary Examiner* — Charles Ehne
(74) *Attorney, Agent, or Firm* — Patterson + Sheridan, LLP

(57) ABSTRACT

Embodiments of the present disclosure provide method and apparatus for memory error correction. The method generally includes tracking information regarding detected errors with one or more memory locations of main memory which may be post-processed during a power-on cycle or component reset. For example, a processor may determine a probability of failure and failure type for the memory locations, based on which the processor may determine one or more memory locations to effectively swap with memory locations of a local memory (e.g., using failure bin groupings). In certain embodiments, due to a limited number of memory locations of main memory that may be swapped with local memory, each memory location may be continuously monitored in order to swap the memory locations of main memory that are highest priority candidates for error correction (e.g., determined based on a corresponding probability of failure and failure type, which may change over time).

15 Claims, 9 Drawing Sheets

(56) References Cited

U.S. PATENT DOCUMENTS

| | | |
|---|---|---|
| 8,689,081 B2 | 4/2014 | Yu et al. |
| 8,719,662 B2 | 5/2014 | Eggleston et al. |
| 8,812,931 B2 | 8/2014 | Rohleder et al. |
| 2005/0081122 A1* | 4/2005 | Hiramatsu .......... G06F 11/2046 714/48 |
| 2007/0162786 A1* | 7/2007 | Shuma ................ G06F 11/1008 714/48 |
| 2008/0215954 A1 | 9/2008 | Oshikiri |
| 2013/0021859 A1 | 1/2013 | Shvydun et al. |
| 2013/0139033 A1 | 5/2013 | Yu et al. |
| 2014/0078841 A1* | 3/2014 | Chopra .............. G11C 29/4401 365/200 |

OTHER PUBLICATIONS

Papavramidou et al, "An Iterative Diagnosis Approach for ECC-based Memory Repair," VLSI Test Symposium (VTS) 2013 IEEE 31st, 6 pages.

Shyue-Kung Lu, "A Novel Built-In Self-Repair Approach for Embedded RAMs," 2003, Journal of Electronic Testing: Theory and Applications 19, pp. 315-324.

Li et al., "A Realistic Evaluation of Memory Hardware Errors and Software System Susceptibility," 2009, downloaded from <https://www.usenix.org/legacy/event/atc10/tech/full_papers/Li.pdf> on Jun. 1, 2015, 14 pages.

* cited by examiner

| FAILURE BINS | PROBABILITY OF ECC FAILURE | BIT FAILURES RATE | COMMENTS |
|---|---|---|---|
| BIN 1 | HIGH | HIGH | POSSIBLE CANDIDATE FOR FUTURE FAILURE AND PRE-LOADING CANDIDATE FOR SUBSEQUENT POWER CYCLE |
| BIN 2 | HIGH | LOW | CONSISTENT FAILURE OBSERVED, BUT FOR ONE OR FEW BIT LOCATIONS |
| BIN 3 | LOW | HIGH | MULTIPLE BIT FAILURES OBSERVED, BUT NOT FOR MANY MEMORY ACCESS ATTEMPTS |
| BIN 4 | LOW | LOW | LOW PROBABILITY ERROR SUCH AS SOFT ERRORS |
| BIN 5 | 0 | 0 | SOFT ERROR (E.G., OCCURS ONLY ONCE) |

FIG. 9

PREDICTIVE IN-FIELD MEMORY REPAIR SCHEME

TECHNICAL FIELD

Embodiments presented herein generally relate to memory error correction, and more specifically, to swapping potentially failing memory locations in main memory with memory locations in local memory based on analysis of memory error information.

BACKGROUND

Embedded memories occupy a large part of modern system-on-Chips (SoCs) and include a large amount of transistors in a single cut. Memories are designed with highly repetitive structures for tight packing. With transistor dimensions shrinking, transistors are becoming more sensitive to process variability. The smaller dimensions of transistors, along with the reduced operating voltages for improvement of power and performance, memory has become more susceptible to a variety of failure mechanisms including noise. Moreover, long term memory reliability concerns are also growing. For example, with requirements for improved system reliability (high availability), health monitoring and diagnostics of memory have become a key quality element in a system design.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 9 is a table of example failure bin groupings of memory locations with detected errors, in accordance with certain embodiments of the present disclosure.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

Figure 1:
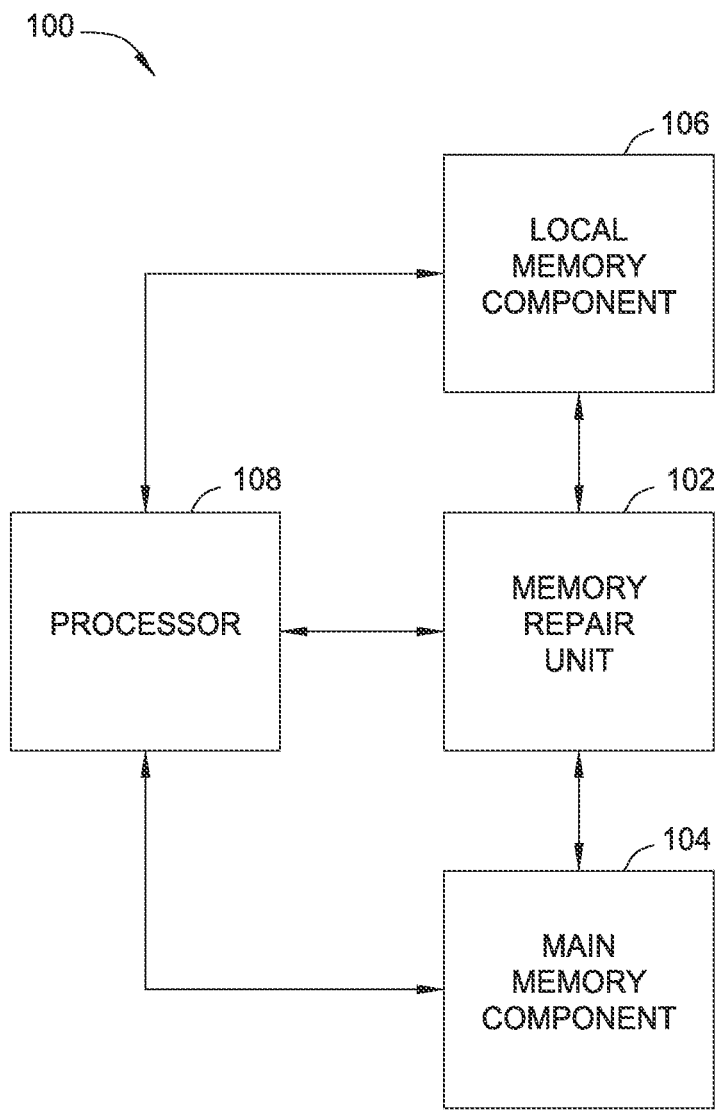
FIG. 1 illustrates an example processing system, in accordance with certain embodiments of the present disclosure.

Embodiments of the present disclosure provide a method for memory error correction. The method may generally include analyzing error information to determine a probability of failure for one or more bits of at least one memory location of main memory, loading an address of the memory location in a local address memory used to store address of potentially failing memory locations, based on the probability of failure, and reading data corresponding to the memory location from a local data memory used to store data for potentially failing memory locations, rather than the main memory, based on detection of the address corresponding to the memory location in the local address memory.

Embodiments of the present disclosure provide logic encoded in one or more tangible media for execution and when executed operable to analyze error information to determine a probability of failure for one or more bits of at least one memory location of main memory, load an address of the memory location in a local address memory used to store address of potentially failing memory locations, based on the probability of failure, and perform error correction by reading data corresponding to the memory location from a local data memory used to store data for potentially failing memory locations, rather than the main memory, based on detection of the address corresponding to the memory location in the local address memory.

Embodiments of the present disclosure provide an apparatus for memory error correction. The apparatus generally includes a local address memory used to store address of potentially failing memory locations, a local data memory used to store data for potentially failing memory locations, a memory repair unit configured to record information corresponding to errors detected with at least one memory location of main memory, and a processing system configured to analyze the information to determine a probability of failure for one or more bits of the memory location and load an address of the memory location in the local address memory, based on the probability of failure, and wherein the memory repair unit is further configured to read data corresponding to the memory location from the local data memory, rather than the main memory, based on detection of the address corresponding to the memory location in the local address memory.

Example Embodiments

As presented above, health monitoring and diagnostics of memory have become a key quality element in a system design. Thus, built-in memory error correction (which may be referred to as "self-repair") is becoming increasingly important for maintaining acceptable fabrication yield and power-on support for correcting memory errors with software (which may be referred to as "soft repair"). A mechanism referred to as Error Correction Code (ECC) may be used to repair/detect errors in a data pattern, which may be written and read to one or more memory locations. ECC generally refers to an algorithm for expressing a sequence of numbers (expressed as a sequence of bits), such that certain errors in the sequence can be detected and corrected based on the remaining numbers in the sequence. Thus, ECC allows data that is being read or transmitted to be checked for errors and, when necessary, corrected on the fly.

As ECC is typically limited to repairing 1 bit errors or detecting 2 bit errors, ECC may be referred to as single-error-correcting and double-error-detecting (SEC-DED). Enhancing ECC to support multi-bit error correction may degrade performance and increase the real estate occupied by hardware.

Embodiments of the present disclosure provide a low area overhead and adaptive in-field memory repair scheme that can tolerate in-field memory failures without the performance impact typically associated with enhancing ECC.

In certain embodiments, error detection and correction schemes may monitor memory ECC failures and create a failure database for post-processing and failure analysis using statistics based memory failure bin grouping. That is, failure bins may be created and used to determine whether to pre-load (e.g., during a power-on cycle or component reset) an address corresponding to a memory location of main memory into a local address memory (LAM) used to store address of potentially failing memory locations. For example, a pattern dependency of a memory failure may be determined and used to distinguish the transient nature of certain failures (e.g., soft-errors), based on which the determination of pre-loading LAM may be made.

A local data memory (LDM) location, corresponding to an address stored in LAM, may be configured to effectively replace a memory location of main memory which, based on the statistical analysis (e.g., the bin grouping), may be determined to have a high probability of failure. Moreover, an address corresponding to a memory location with a detected failure may also be loaded into LAM during regular operations. Thus, embodiments of the present disclosure support self-repair during regular operation and future self-repair preloading (e.g., during a power-on cycle) based on prior failure statistics.

FIG. 1 illustrates an example of processing system 100, in which embodiments or the present disclosure may be practiced. For example, memory repair unit (MRU) 102 may be configured to repair detected errors in locations of a main memory component 104 accessed by a processor 108, using a local memory component 106.

The MRU 102 may be implemented in hardware, for example, as a standalone processor or integrated as part of processor 108. The processor 108 may be configured to read and write data to and from the main memory 104 and local memory 106. In certain embodiments of the present disclosure, the MRU 102 may receive error information corresponding to the main memory 104 and record the information in the local memory 106, as will be discussed in more detail with respect to FIG. 2. The processor 108 may perform statistical analysis based on the information in the local memory 106. In certain embodiments of the present disclosure, the MRU 102 and processor 108 may be configured to implement error correction based on the statistical analysis. The MRU 102, main memory 104, local memory 106, and processor 108 may be separate components or may all reside within a single device (e.g., a memory control device).

Figure 2:
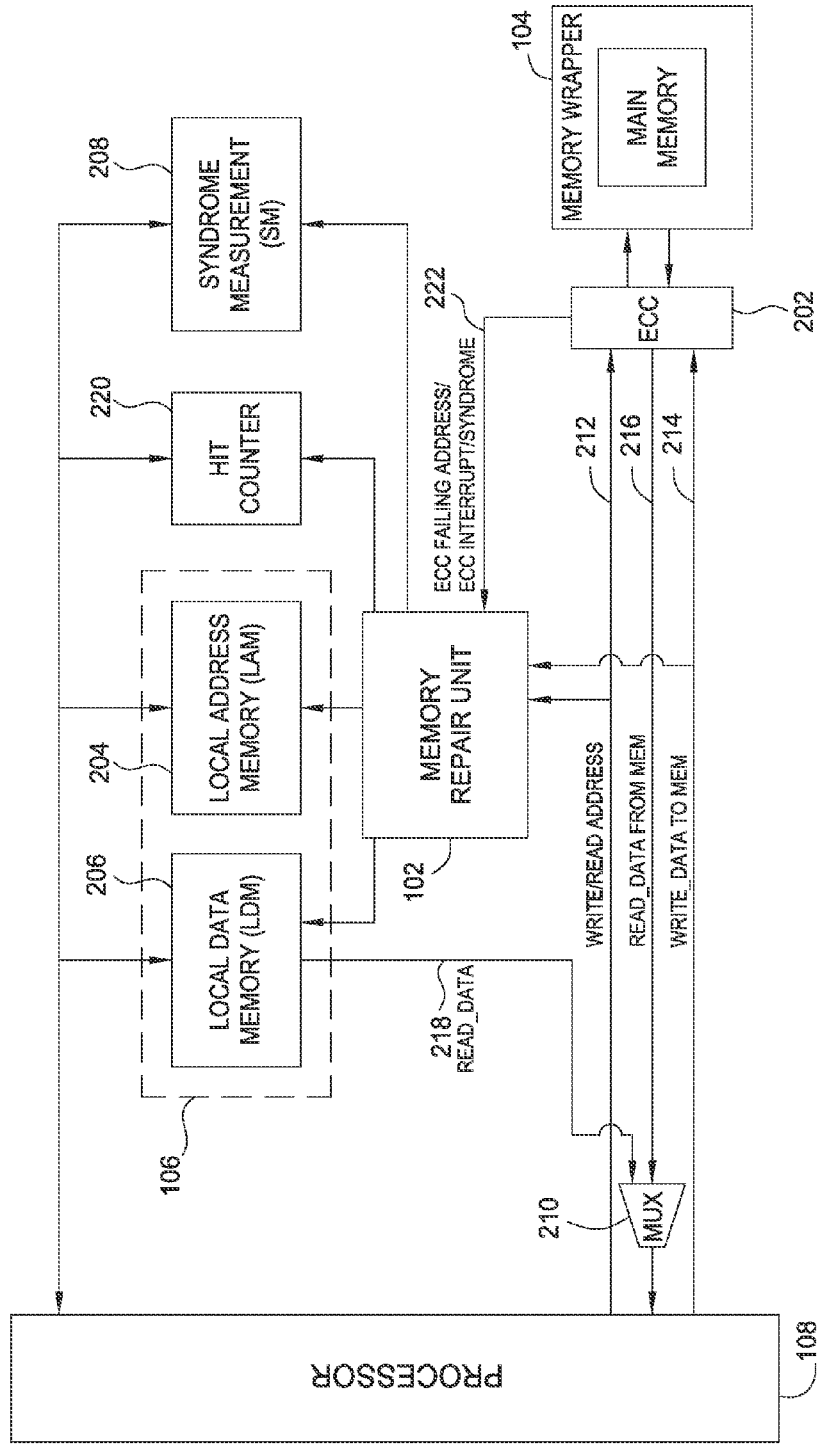
FIG. 2 is a block diagram of the memory repair system, in accordance with certain embodiments of the present disclosure.

As illustrated in FIG. 2, the main memory 104 may be coupled to a error correction code (ECC) component 202 that detects failures associated with memory locations during read and write cycles. For example, ECC 202 may receive a write/read address signal 212 from the processor 108 indicating an address to which data is to be written or to which data is to be read from. That is, during a write cycle, data may be received by the ECC 202 via a write data signal 214. The data from the write data signal 214 may be written to the address in main memory indicated by the write/read address signal 212. Similarly, during a read cycle, the write/read address signal 212 may indicate an address in main memory from which data is to be read. The data from main memory corresponding to the address may be communicated to the processor 108 using the read data signal 216.

During the write and read cycles described above, ECC 202 may detect errors associated with a memory location of main memory 104 and report the detection of those errors to MRU 102 (e.g., via signal 222, any 1 or 2 bit error corresponding to a memory location in main memory), along with the address of the memory location. The ECC may also report, via signal 222, a syndrome corresponding to the error, which may indicate the location of a particular bit in the memory location that incurred the detected error.

In certain embodiments, the MRU 102 may also receive an interrupt signal, via signal 222, indicating than an error has been detected by the ECC. The information received by the MRU 102 may be stored, by the MRU 102, in local memory 106. For example, the address of memory locations with detected errors may be stored in LAM 204 and the data corresponding to the memory locations may be recorded in LDM 206.

In certain embodiments of the present disclosure, the MRU 102 also tracks the number of detected errors for the memory location, together with the number of access attempts to the memory location, using hit counters 220. For example, the number of errors detected corresponding to the memory location may be tracked using an error hit counter (EHC) and the number of access attempts to the memory location may be tracked using a memory access hit counter (MHC). The syndrome corresponding to the detected error, as reported by the ECC 202 to the MRU 102, may also be tracked at a syndrome measurement (SM) block 208.

The processor 108 may be configured to perform statistical analysis based on the information in the hit counter 220, and SM block 208. For example, the processor 108 may analyze the information in the hit counter 220, and SM block 208 to determine a probability of failure and a bit failure rate for memory locations in main memory 104 with detected errors. Based on the probability of failure and the bit failure rate, the processor 108 determines whether to pre-load (e.g., during a power-on cycle or component reset) addresses corresponding to memory locations with detected errors in LAM 204.

Therefore, during normal operation, processor 108 may read/write data to/from memory locations in LDM, corresponding to the addresses stored in LAM, rather than main memory. During normal operation, processor 108 may also continue to update the LDM and LAM (e.g., based on ECC failure detection). In this manner, LDM locations corresponding to addresses stored in LAM will effectively replace potentially failing memory location in main memory.

For example, the processing system 100 may comprise a multiplexer 210, configured to control whether data is read from local memory 106 or main memory 104. During a read cycle, the MRU 102 receives a read address from the write/read address signal 212. The MRU 102 determines whether the read address matches a read address in LAM 204. If so, the data corresponding to the address will be read from local data memory 206 instead of main memory 104. For example, the MRU 102 may control the multiplexer 210 such that the multiplexer selects the read data signal 218

(from LDM), as opposed to the read data signal 216 (from main memory), to communicate back to the processor 108, as will be describe in more detail below. The MRU 102, LAM 204, LDM 206, hit counter 220 and syndrome measurement block 208 may be implemented in hardware.

It should be noted that the operations of the MRU 102 may not interfere with the functional path of memory access between the processor 108 and main memory 104. Therefore, the memory error correction techniques of the present disclosure do not add extra latency to the read/write cycle function of the processor 108. Therefore, the performance of a system implementing embodiments of present disclosure may be preserved.

As presented above, during a power-on cycle or component reset, the processor 108 may preload addresses of one or more memory locations of main memory in LAM 204. For example, as discussed in more detail with respect to FIG. 3, information tracked in MHC and EHC may be used to determine, based on analyzed failure probabilities for the memory locations, which addresses of main memory should be pre-loaded in LAM 204 during a power-on cycle or component reset.

Figure 3:
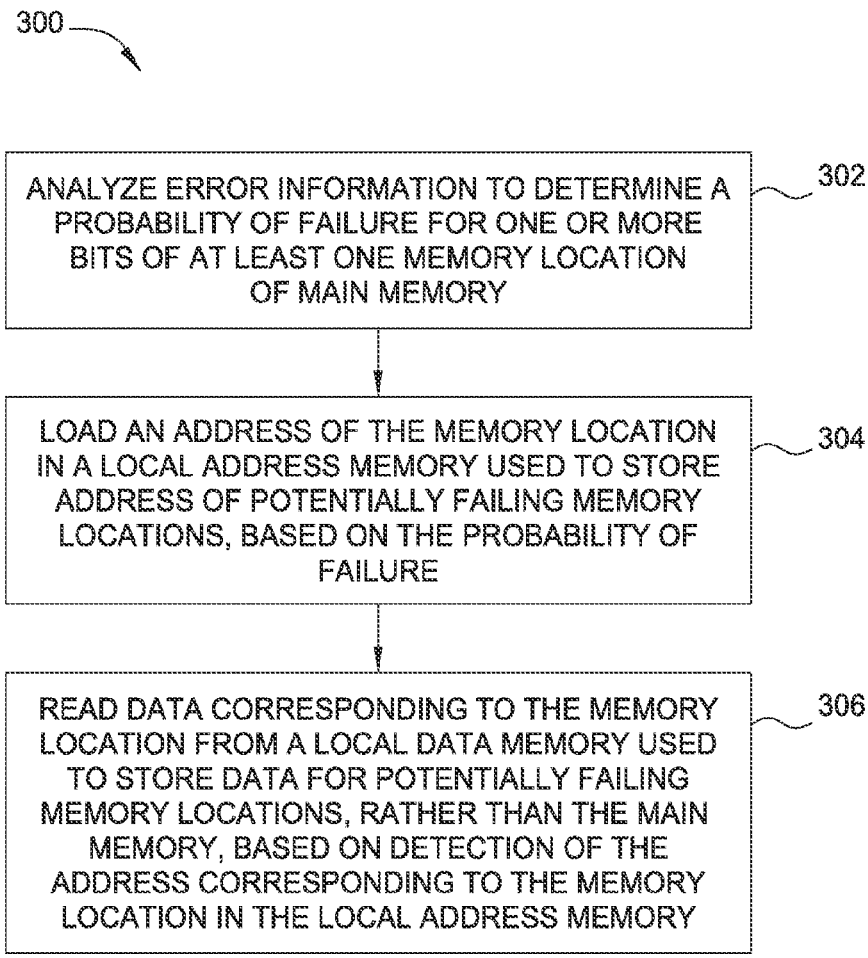
FIG. 3 illustrates example operations for memory error correction, in accordance with certain embodiments of the present disclosure.

FIG. 3 illustrates example operations 300 for memory error correction, in accordance with embodiments of the present disclosure. The operations 300 may be performed, for example, by a processor, such as the processor 108 in conjunction with MRU 102.

The operations 300 begin, at 302, by analyzing (e.g., during the power-on cycle or component reset) error information to determine a probability of failure for one or more bits of at least one memory location of main memory. That is, during a power-on cycle or component reset, error information (e.g., tracked in MHC and EHC during, for example, normal operation) are post-processed to determine one or more addresses of main memory to load (e.g., preload) in LAM.

For example, at 304, the processor loads (e.g., pre-loads during the power-on cycle or component reset) an address of the memory location in a local address memory used to store address of potentially failing memory locations, based on the probability of failure (e.g., determined based the analysis at 302). For example, as described in more detail with respect to FIGS. 8 and 9, the processor may calculate a probability of ECC failure for each memory location previously recorded in LAM, based on which the processor makes the preloading determination (e.g., based on failure bin groupings). In certain embodiments, the preloading determination of memory locations in LAM may be based on analysis performed during a current power-on cycle or component reset as compared with analysis performed during a previous power-on cycle or component reset, as discussed in more detail with respect to FIG. 8.

Figure 4:
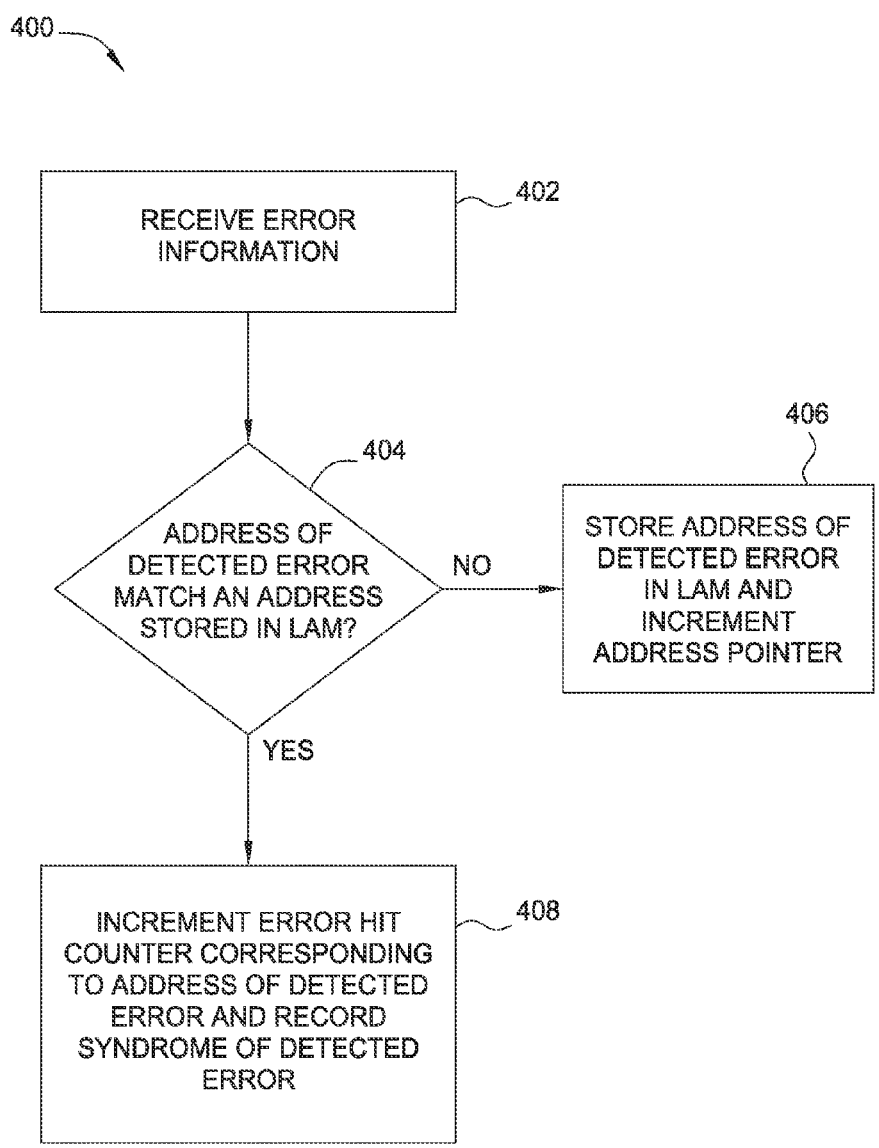
FIG. 4 illustrate example operations for tracking detected errors, in accordance with certain embodiments of the present disclosure.

In certain embodiments, an address corresponding to a failing memory location may be loaded in LAM after an error is detected with the memory location, without performing an analysis of a failure probability for the memory location (e.g., loaded in LAM "on-the-fly" upon error detection), as discussed in more detail with respect to FIG. 4.

The information loaded in LAM is used to effectively swap a corresponding memory location in main memory with a memory location in LDM. For example, at 306, the processor reads data corresponding to the memory location from a local data memory 206 used to store data for potentially failing memory locations, rather than the main memory 104, based on detection of the address corresponding to the memory location in the local address memory 204.

In certain embodiments of the present disclosure, the health and failure type of the memory location in main memory are continuously monitored. That is, even though the processor reads data corresponding to the memory location from LDM rather than main memory, the processor continues to access the memory location in main memory to check the health of the memory location. Therefore, the ECC component continues to monitor and detect errors corresponding to the memory location and the MHC, EHC, and syndrome block are continuously updated. In other words, due to a limited number of addresses that may be loaded in LAM, each memory location may be continuously monitored in order to update the contents of LAM with addresses of memory locations that are highest priority candidates for error correction (e.g., determined based on a corresponding probability of failure and failure type, which may change over time).

FIGS. 4-8 illustrate example operations that provide additional details corresponding to the individual operations described with respect to FIG. 3.

For example, FIG. 4 illustrates example operations 400 for recording information corresponding to an ECC error, as performed at step 302 of operations 300. The operations 400 begin at 402 by the MRU 102 receiving an indication of an ECC error from the ECC 202. That is, the MRU 102 may receive an address (i.e., ECC address) in main memory where an error is detected, an interrupt signal (e.g., indicating to the MRU 102 that an error has been detected), and the syndrome of the detected error. At 404, the MRU 102 determines whether the ECC address matches with an address stored in LAM. If not, at 406, the MRU 102 will store the ECC address in LAM and store the syndrome of the failure in a SM block corresponding to the ECC address. The MRU 102 may also increment an address pointer such that another ECC address corresponding to a different ECC failure will be recorded in a different location in LAM, based on the incremented address pointer.

Alternatively, if the ECC address matches with an address stored in the LAM, the MRU 102, at 408, increments the EHC for the corresponding ECC address to indicate that there is one more ECC failure corresponding to the memory location represented by the ECC address. Moreover, the MRU may decode the syndrome of the detected error and store the syndrome in the SM block by performing an "OR" logic operation with the existing syndrome for the ECC address.

Figure 5:
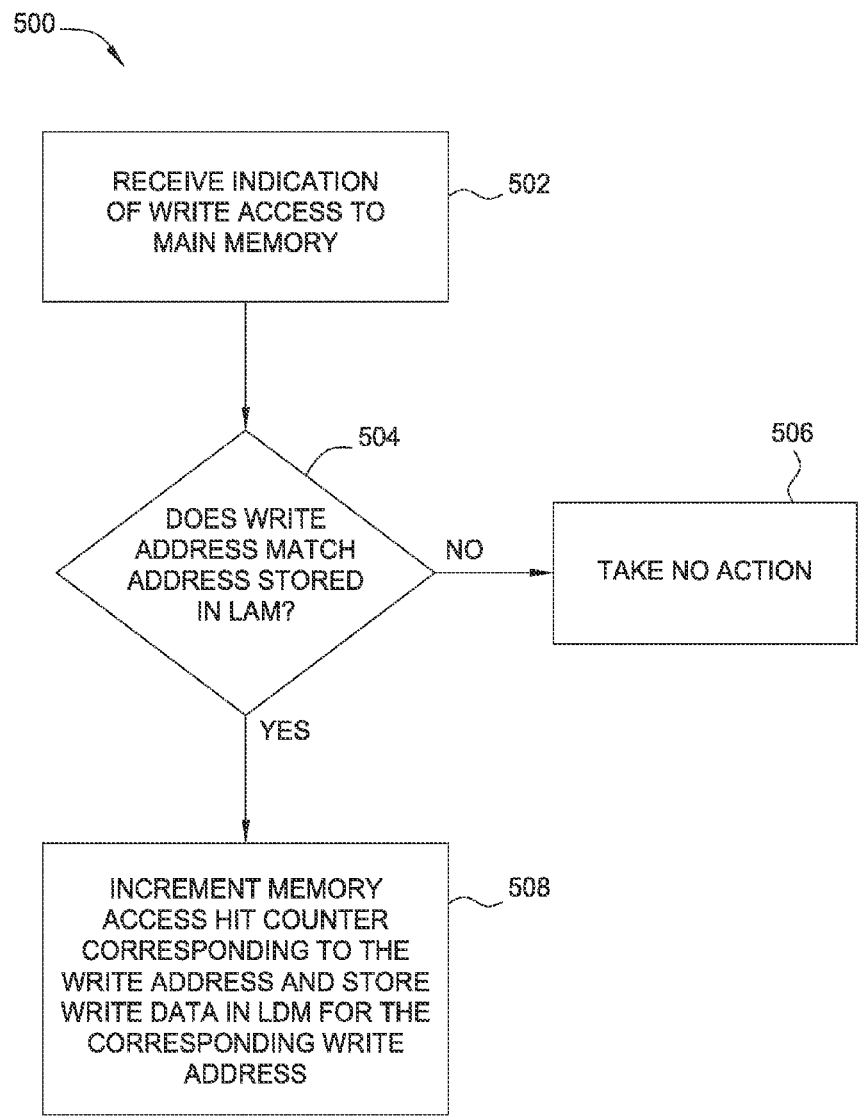
FIG. 5 illustrate example operations for tracking write access attempts to main memory, in accordance with certain embodiments of the present disclosure.

FIG. 5 illustrates example operations 500, by the MRU 102, performed during a write cycle. The operations 500 begin at 502 by the MRU 102 receiving an indication of a write access to memory, including the write address (e.g., via signal 212). At 504, the MRU 102 determines whether the write address matches with an address stored in LAM. If not, at 506, the MRU 102 takes no action because the memory location corresponding to the write address has not been determined to be a potentially failing memory location. Otherwise, at 508, the MRU 102 increments an MHC corresponding to the write address to track that there is one more memory access request corresponding to the write address. The MRU 102 also stores the data (e.g., received via write data signal 214) corresponding to the write address in an LDM location corresponding to the write address. As described with reference to FIG. 6, this data may then be used during future read cycles for the memory location, thus, effectively replacing the memory location corresponding to the write address in main memory.

Figure 6:
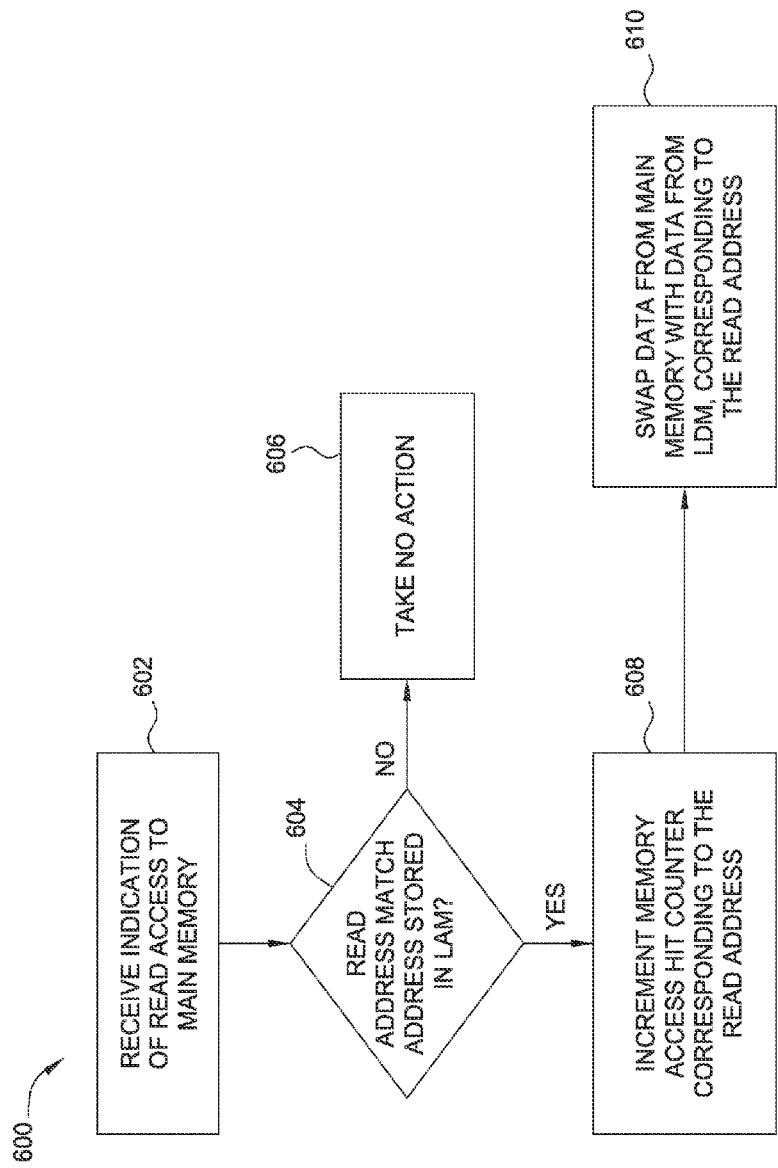
FIG. 6 illustrate example operations for tracking a number of read requests and swapping data from main memory with data from local memory, in accordance with certain embodiments of the present disclosure.

FIG. 6 illustrates example operations 600, by the MRU 102, performed during a read cycle. At 602, the MRU 102 receives an indication of read access (e.g., read request) to main memory, together with a read address (e.g., via signal write/read address 212). At 604, the MRU 102 determines whether the read address matches an address previously stored in LAM. If not, at 606, the MRU 102 takes no action because the memory location corresponding to the read address has not been determined to be a potentially failing memory location.

Otherwise, at 608, the MRU 102 increments the MHC corresponding to the read address to track that there is one more memory access request corresponding to the read address. In addition, at 610, the MRU 102 may swap data retrieved from main memory in response to the read request with data from LDM. For example, the MRU may control the multiplexer 210 to select read data from signal 218 from LDM, as opposed to read data signal 216 from main memory, to communicate back to the processor 108. In certain embodiments, the MRU 102 may create a data valid signal, indicating that data from LDM has been retrieved and is available at signal 218. For example, the multiplexer may be configured to select read data from signal 218 from LDM, based on the data valid signal. In certain embodiments, read data signal 218 may be selected after a memory read latency match. That is, latency in retrieving the read data from LDM is matched with latency in retrieving the read data from main memory.

Figure 7:
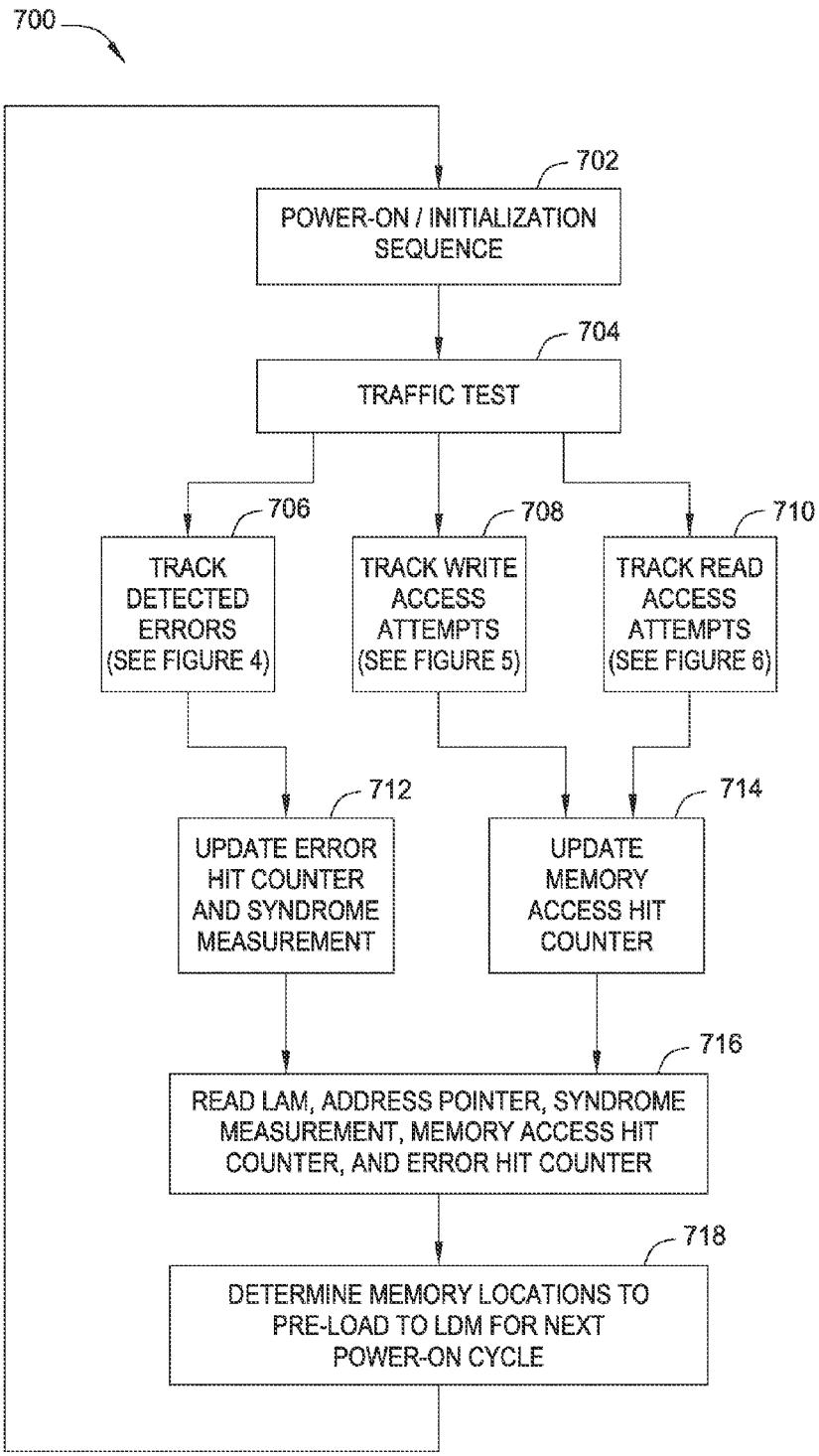
FIG. 7 illustrates example operations for detecting, analyzing, and correcting memory errors, in accordance with certain embodiments of the present disclosure.

FIG. 7 illustrates example operations 700 for detecting, analyzing, and correcting memory errors, in accordance with certain embodiments of the present disclosure. At 702, a device according to the processing system 100 may be powered on or initialized and may perform, at 704, a traffic test of main memory 104. During the traffic test, information corresponding to one or more memory location in main memory may be recorded by MRU 102. For example, operations described with respect to FIG. 4 may be carried out at block 706, such that EHCs and SMs corresponding to the memory locations are updated at block 712.

In addition, the MRU 102 may track a number write and read access attempts to main memory at blocks 708 and 710 according to operations described with respect to FIGS. 5 and 6, such that the MHCs corresponding to the memory locations are updated at block 714. At 716, the processor 108 may read the LAM, an address pointer, EHC, SM, and MHC (e.g., during a safe power-down sequence), based on which the processor 108 may execute a post-processing script. For example, at 718, the post-processing script may be executed by the processor 108 to determine which of the memory addresses (e.g., from the addresses read from LAM at 716) are to be preloaded into LAM during a subsequent power-on cycle or component reset.

Figure 8:
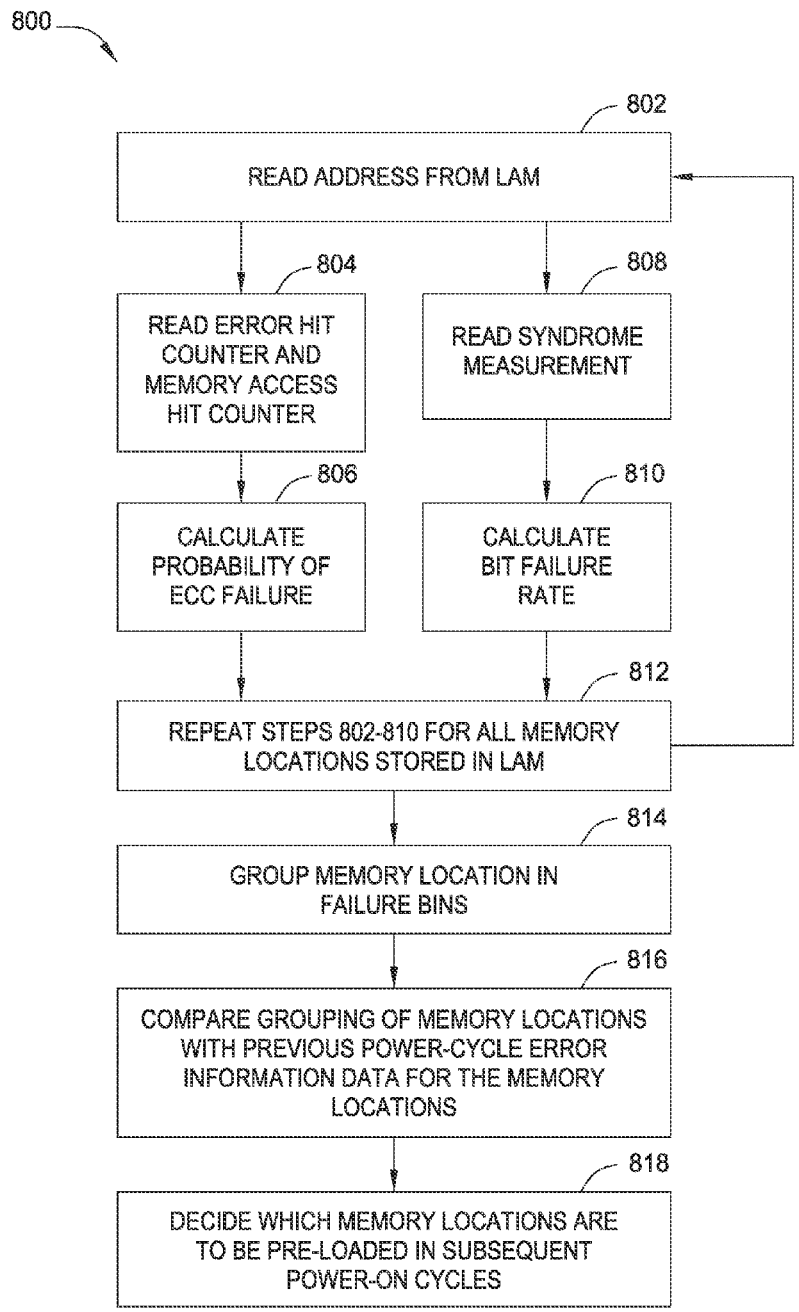
FIG. 8 illustrates example operations for analyzing and determining memory locations in main memory that are candidates for swapping with local memory, in accordance with certain embodiments of the present disclosure.

FIG. 8 illustrates example operations 800 for determining which of the addresses are to be preloaded into LAM during a subsequent power-on cycle or component reset. For example, the operations 800 may correspond to operation 718 in FIG. 7.

At 802, the processor 108 may read an initial address previously stored in LAM at a particular memory location. At 804, the processor 108 may read the EHC and MHC for the memory location and, at 806, calculate a probability of ECC failure for the memory location, according to the following equation:

$$\text{Probability of Failure} = \frac{ECC \text{ Hit Counter } (EHC)}{\text{Memory Access Hit Counter } (MHC)}$$

At 808, the processor 108 may read the SM for the same memory location and, at 810, calculate a bit failure rate for the memory location based on the SM (e.g., based on a number bits in SM block with a value (e.g., 0 or 1) indicating that an error corresponding to the those bits has been detected). At 812, the processor 108 repeats steps 802-810 for all memory locations with a corresponding address stored in LAM. For example, the processor 108 may repeat steps 802-810 beginning at an initial address in LAM represented by a variable and increment the variable after each iteration until the variable is less than an address pointer indicating the location of the last address stored in LAM.

At 814, the processor 108 may create failure bins (e.g., categories) for each memory location, based on at least one of the probability of ECC failure and bit failure rate calculated for each memory location.

For example, FIG. 9 is a table 900 of five failure bins to which the memory locations may be designated. That is, memory locations with a high probability of ECC failure, and a high bit failure rate may be designated under bin number one. These memory locations are candidates for incurring future failures and thus, preloading candidate for a subsequent power-on cycle or component reset. Memory locations with a high probability of ECC failure and a low bit failure rate may be designated under bin number two. These memory locations may have incurred numerous failures, however, the failures may have been from the same, or a few number of bit locations as indicated by the SM for the memory location. Memory locations with a low probability of failure, but a high bit failure rate may be designated under bin number three. These memory locations may have incurred few failures, however, with varying failure bit locations. Memory locations with both low probability of failure and low bit failure rate may be designated under bin number four. Memory locations in this bin have a low probability of failure that may not be repeatable (e.g., soft-errors). Memory locations with zero (or nearly zero) probability of failure and bit failure rate are designated under bin number five. These memory locations have low probability of failure that is not repeatable (e.g., soft-errors). Based on the software heuristics, memory locations corresponding to bin 1 and 2 categories may be more likely candidates for preloading into LAM in subsequent power-on cycles or component reset.

Referring again to FIG. 8, at 816, the processor 108 compares the pre-loading candidates with previous power-cycle data. That is, the processor 108 may cumulatively analyze the corresponding failure bins of the memory locations with previous power cycle results to observe which memory location failures are consistent. The determination of pre-loading candidates, at 818, may be based on the failure bin groupings of the memory locations at 814, and in certain embodiments, further based on the comparison at 816.

LDM locations corresponding to these pre-loaded addresses will be able to functionally replace the corresponding memory locations in main memory after the first valid write to the memory location, as described with reference to FIGS. 5 and 6. Embodiments of the present disclosure enable system software to make diagnostic decisions based on failure trends and improve system reliably while providing a fault tolerant system.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The flowchart and block diagrams in the Figures illustrate the architecture, functionality and operation of possible implementations of systems or methods. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

In view of the foregoing, the scope of the present disclosure is determined by the claims that follow.

We claim:

1. A method for memory error correction, comprising:
   tracking a number of read and write attempts to at least one memory location of main memory;
   analyzing error information to determine a probability of failure for one or more bits of the memory location, wherein the error information comprises information tracking a number of errors detected for the memory location, wherein analyzing the information to determine the probability of failure is based on the number of read and write attempts and the number of errors detected for the memory location;
   loading an address of the memory location in a local address memory used to store address of potentially failing memory locations, based on the probability of failure; and
   reading data corresponding to the memory location from a local data memory used to store data for potentially failing memory locations, rather than the main memory, based on detection of the address corresponding to the memory location in the local address memory.

2. The method of claim 1, further comprising analyzing the information to determine a number of bits in the memory location with detected errors, wherein loading the address of the memory location in the local address memory is further based on the number of bits.

3. The method of claim 2, further comprising categorizing the memory location based on the probability of failure and the number of bits of the memory location with detected errors, wherein loading the address of the memory location in the local address memory is based on the categorization.

4. A method for memory error correction, comprising:
   analyzing error information to determine a probability of failure for one or more bits of at least one memory location of main memory;
   loading an address of the memory location in a local address memory used to store address of potentially failing memory locations, based on the probability of failure; and
   reading data corresponding to the memory location from a local data memory used to store data for potentially failing memory locations, rather than the main memory, based on detection of the address corresponding to the memory location in the local address memory, wherein loading the address of the memory location in the local address memory is performed during a power-on cycle or a component reset.

5. A method for memory error correction, comprising:
   analyzing error information to determine a probability of failure for one or more bits of at least one memory location of main memory;
   loading an address of the memory location in a local address memory used to store address of potentially failing memory locations, based on the probability of failure;
   reading data corresponding to the memory location from a local data memory used to store data for potentially failing memory locations, rather than the main memory, based on detection of the address corresponding to the memory location in the local address memory, wherein determining the probability of failure for the memory location is performed after a power-on cycle; and
   comparing the probability of failure to another probability of failure for the memory location determined prior to the power-on cycle wherein loading the address of the memory location in the local address memory is based on the comparison.

6. Logic encoded in one or more non-transitory machine-readable storage medium for execution and when executed operable to:
   track a number of read and write attempts to at least one memory location of main memory;
   analyze error information to determine a probability of failure for one or more bits of the memory location, wherein the error information comprises information tracking a number of errors detected for the memory location, wherein analyzing the information to determine the probability of failure is based on the number of read and write attempts and the number of errors detected for the memory location;
   load an address of the memory location in a local address memory used to store address of potentially failing memory locations, based on the probability of failure; and
   perform error correction by reading data corresponding to the memory location from a local data memory used to store data for potentially failing memory locations, rather than the main memory, based on detection of the address corresponding to the memory location in the local address memory.

7. The logic of claim 6, further operable to analyze the information to determine a number of bits in the memory location with detected errors, wherein loading the address of the memory location in the local address memory is further based on the number of bits.

8. The logic of claim 7, further operable to categorize the memory location based on the probability of failure and the number of bits with detected errors, wherein loading the address of the memory location in the local address memory is based on the categorization.

9. The logic of claim 6, wherein loading the address of the memory location in the local address memory is performed during a power-on cycle or a component reset.

10. The logic of claim 6, wherein determining the probability of failure for the memory location is performed after a power-on cycle, the logic further operable to:
    compare the probability of failure to another probability of failure for the memory location determined prior to the power-on cycle, and
    wherein loading the address of the memory location in the local address memory is based on the comparison.

11. An apparatus for memory error correction, comprising:
- a local address memory used to store address of potentially failing memory locations;
- a local data memory used to store data for potentially failing memory locations;
- a memory repair unit configured to:
  - track a number of read and write attempts to at least one memory location of main memory;
  - record information corresponding to errors detected with the memory location, wherein recording the information comprises tracking a number of errors detected for the memory location; and
- a processing system configured to:
  - analyze the information to determine a probability of failure for one or more bits of the memory location, wherein analyzing the information to determine the probability of failure is based on the number of read and write attempts and the number of errors detected; and
  - load an address of the memory location in the local address memory, based on the probability of failure, and wherein the processing system is further configured to read data corresponding to the memory location from the local data memory, rather than the main memory, based on detection of the address corresponding to the memory location in the local address memory.

12. The apparatus of claim 11, wherein loading the address of the memory location in the local address memory is performed during a power-on cycle or a component reset.

13. The apparatus of claim 11, further comprising an error correction code component configured to detect errors with the at least one memory location and communicate the detected errors to the memory repair unit, wherein the memory repair unit is configured to load an address of the memory location in the local address memory.

14. The apparatus of claim 11, wherein the processing system is further configured to analyze the information to determine a number of bits in the memory location with detected errors, and
  - wherein loading the address of the memory location in the local address memory is further based on the number of bits.

15. The apparatus of claim 14, wherein the processing system is further configured to categorize the memory locations based on the probability of failure and the number of bits with detected errors, wherein loading the address of the memory location in the local address memory is based on the categorization.

* * * * *